US009449319B1

(12) United States Patent
Agarwal et al.

(10) Patent No.: US 9,449,319 B1
(45) Date of Patent: Sep. 20, 2016

(54) CONDUCTING TRANSACTIONS WITH DYNAMIC PASSWORDS (75) Inventors: Amit Agarwal, Mercer Island, WA (US); Isaac Oates, Seattle, WA (US); Chesley Coughlin, Issaquah, WA (US)

(73) Assignee: Amazon Technologies, Inc., Seattle, WA (US)

(*) Notice: Subject to any disclaimer, the term of this patent is extended or adjusted under 35 U.S.C. 154(b) by 363 days.

(21) Appl. No.: 12/165,081

(22) Filed: Jun. 30, 2008

(51) Int. Cl.
*G06Q 20/00* (2012.01)
*G06Q 20/38* (2012.01)

(52) U.S. Cl.
CPC .................................. *G06Q 20/382* (2013.01)

(58) Field of Classification Search
CPC ............................ G06Q 20/00; G06Q 20/382
USPC ............................................................ 705/64
See application file for complete search history.

(56) References Cited

U.S. PATENT DOCUMENTS

| | | |
|---|---|---|
| 5,890,137 A | 3/1999 | Koreeda |
| 5,953,710 A | 9/1999 | Fleming |
| 6,332,131 B1 | 12/2001 | Grandcolas et al. |
| 6,360,254 B1 | 3/2002 | Linden et al. |
| 6,484,182 B1 | 11/2002 | Dunphy et al. |
| 6,636,242 B2 | 10/2003 | Bowman-Amuah |
| 6,658,568 B1 | 12/2003 | Ginter et al. |
| 6,661,431 B1 | 12/2003 | Stuart et al. |
| 6,853,987 B1 | 2/2005 | Cook |
| 6,868,395 B1 | 3/2005 | Szlam et al. |
| 6,961,858 B2 | 11/2005 | Fransdonk |
| 6,980,960 B2 | 12/2005 | Hajdukiewicz et al. |
| 6,988,657 B1 | 1/2006 | Singer et al. |
| 7,020,635 B2 | 3/2006 | Hamilton et al. |
| 7,058,718 B2 | 6/2006 | Fontes et al. |
| 7,073,129 B1 | 7/2006 | Robarts et al. |
| 7,080,049 B2 | 7/2006 | Truitt et al. |
| 7,089,497 B2 | 8/2006 | Abbott et al. |
| 7,090,128 B2 | 8/2006 | Farley et al. |
| 7,107,226 B1 | 9/2006 | Cassidy et al. |
| 7,107,462 B2 | 9/2006 | Fransdonk |
| 7,117,165 B1 | 10/2006 | Adams et al. |
| 7,136,841 B2 | 11/2006 | Cook |
| 7,150,045 B2 | 12/2006 | Koelle et al. |

(Continued)

FOREIGN PATENT DOCUMENTS

FR      2829647 A1 *  3/2003  ............. G06Q 20/04

OTHER PUBLICATIONS

Gary C. Kessler—Passwords—Strengths and Weaknesses. http://www.garykessler.net/library/password.html Jan. 1996. Retrieved online Feb. 1, 2011.*

(Continued)

*Primary Examiner* — James A Reagan
(74) *Attorney, Agent, or Firm* — Lee & Hayes, PLLC (57) ABSTRACT

Techniques for conducting transactions with one-time passwords are described herein. These techniques may include receiving a request to conduct a transaction, as well as a one-time password and an identifier linked with a payment instrument. The identifier may or may not identify the linked payment instrument. In both instances, a transaction processing service may compare the received one-time password with a one-time password stored at or accessible by the transaction processing service. If the passwords match, the service may approve the transaction. Otherwise, the service may decline the transaction or implement one or more additional authorization procedures.

33 Claims, 5 Drawing Sheets

(56) References Cited

U.S. PATENT DOCUMENTS

| | | |
|---|---|---|
| 7,185,010 B2 | 2/2007 | Morinville |
| 7,225,156 B2 | 5/2007 | Fisher et al. |
| 7,319,986 B2 | 1/2008 | Praisner et al. |
| 7,324,968 B2 | 1/2008 | Rotman et al. |
| 7,379,921 B1 | 5/2008 | Kiliccote |
| 7,383,231 B2 | 6/2008 | Gupta et al. |
| 7,434,723 B1 | 10/2008 | White et al. |
| 7,478,331 B2 | 1/2009 | Abbott et al. |
| 7,496,849 B2 | 2/2009 | Abbott et al. |
| 7,552,365 B1 | 6/2009 | Marsh et al. |
| 7,580,699 B1 | 8/2009 | Shaw et al. |
| 7,587,502 B2 | 9/2009 | Crawford et al. |
| 7,676,407 B2 | 3/2010 | Van De Van et al. |
| 7,685,013 B2 | 3/2010 | Gendler |
| 7,711,586 B2 | 5/2010 | Aggarwal et al. |
| 7,729,994 B2 | 6/2010 | Gupta et al. |
| 7,748,614 B2 | 7/2010 | Brown |
| 7,809,819 B2 | 10/2010 | DeLima et al. |
| 7,827,101 B2 | 11/2010 | Mascavage, III |
| 7,917,160 B2 | 3/2011 | Choe et al. |
| 8,027,918 B2 | 9/2011 | Nielsen et al. |
| 8,046,256 B2 | 10/2011 | Chien et al. |
| 8,150,768 B2 | 4/2012 | Gupta et al. |
| 8,249,988 B2 | 8/2012 | Teicher |
| 8,271,395 B2 | 9/2012 | Dominguez et al. |
| 8,636,206 B2 | 1/2014 | Rothwell et al. |
| 9,123,069 B1 | 9/2015 | Haynes et al. |
| 2001/0034724 A1 | 10/2001 | Thieme |
| 2001/0044756 A1 | 11/2001 | Watkins et al. |
| 2002/0007351 A1 | 1/2002 | Hillegass et al. |
| 2002/0032605 A1 | 3/2002 | Lee |
| 2002/0046169 A1 | 4/2002 | Keresman, III et al. |
| 2002/0046191 A1 | 4/2002 | Joao |
| 2002/0087477 A1 | 7/2002 | Mantena et al. |
| 2002/0103752 A1 | 8/2002 | Berger et al. |
| 2002/0112171 A1 | 8/2002 | Ginter et al. |
| 2002/0120567 A1 | 8/2002 | Caplan et al. |
| 2002/0138366 A1 | 9/2002 | Skantze |
| 2002/0174030 A1 | 11/2002 | Praisner et al. |
| 2002/0175517 A1 | 11/2002 | Anderson |
| 2002/0194138 A1 | 12/2002 | Dominguez et al. |
| 2003/0004831 A1 | 1/2003 | Owens |
| 2003/0046172 A1 | 3/2003 | Himmel et al. |
| 2003/0061170 A1 | 3/2003 | Uzo |
| 2003/0083983 A1 | 5/2003 | Fisher et al. |
| 2003/0105682 A1 | 6/2003 | Dicker et al. |
| 2003/0126018 A1 | 7/2003 | LaMotta et al. |
| 2003/0126094 A1 | 7/2003 | Fisher et al. |
| 2003/0135625 A1 | 7/2003 | Fontes et al. |
| 2003/0139971 A1 | 7/2003 | Rescigno et al. |
| 2003/0173407 A1 | 9/2003 | Raadsen |
| 2003/0220875 A1 | 11/2003 | Lam et al. |
| 2004/0111370 A1 | 6/2004 | Saylors et al. |
| 2004/0128211 A1 | 7/2004 | Tsai |
| 2004/0143547 A1 | 7/2004 | Mersky |
| 2004/0198308 A1 | 10/2004 | Hurst et al. |
| 2004/0225606 A1 | 11/2004 | Nguyen et al. |
| 2004/0267672 A1 | 12/2004 | Gray et al. |
| 2005/0027639 A1 | 2/2005 | Wong |
| 2005/0097037 A1 | 5/2005 | Tibor |
| 2005/0108153 A1 | 5/2005 | Thomas et al. |
| 2005/0114666 A1 | 5/2005 | Sudia |
| 2005/0125317 A1 | 6/2005 | Winkelman et al. |
| 2005/0149439 A1 | 7/2005 | Suisa |
| 2005/0154744 A1 | 7/2005 | Morinville |
| 2005/0166265 A1 | 7/2005 | Satomi |
| 2005/0167489 A1 | 8/2005 | Barton et al. |
| 2005/0198534 A1* | 9/2005 | Matta ............... G06F 21/31 726/5 |
| 2005/0240493 A1 | 10/2005 | Johnson et al. |
| 2005/0251447 A1 | 11/2005 | Lane |
| 2005/0278222 A1 | 12/2005 | Nortrup |
| 2005/0278263 A1 | 12/2005 | Hollander et al. |
| 2006/0015458 A1 | 1/2006 | Teicher |
| 2006/0015463 A1 | 1/2006 | Gupta et al. |
| 2006/0069654 A1 | 3/2006 | Beach et al. |
| 2006/0080238 A1 | 4/2006 | Nielsen et al. |
| 2006/0111967 A1 | 5/2006 | Forbes |
| 2006/0136309 A1 | 6/2006 | Horn et al. |
| 2006/0212392 A1 | 9/2006 | Brown |
| 2006/0212393 A1 | 9/2006 | Lindsay Brown |
| 2006/0213983 A1 | 9/2006 | Walker et al. |
| 2006/0219776 A1* | 10/2006 | Finn ............... B60R 25/25 235/380 |
| 2006/0248452 A1 | 11/2006 | Lambert et al. |
| 2006/0265489 A1 | 11/2006 | Moore |
| 2006/0271476 A1 | 11/2006 | Thompson |
| 2006/0277474 A1 | 12/2006 | Robarts et al. |
| 2007/0005495 A1 | 1/2007 | Kim |
| 2007/0073630 A1 | 3/2007 | Greene et al. |
| 2007/0078760 A1 | 4/2007 | Conaty et al. |
| 2007/0083433 A1 | 4/2007 | Lawe |
| 2007/0106606 A1 | 5/2007 | Pankratz et al. |
| 2007/0150299 A1 | 6/2007 | Flory |
| 2007/0157110 A1 | 7/2007 | Gandhi et al. |
| 2007/0158413 A1 | 7/2007 | Hastie |
| 2007/0179790 A1 | 8/2007 | Leitch et al. |
| 2007/0192245 A1 | 8/2007 | Fisher et al. |
| 2007/0198432 A1 | 8/2007 | Pitroda et al. |
| 2007/0226084 A1 | 9/2007 | Cowles |
| 2007/0233579 A1 | 10/2007 | Saarinen et al. |
| 2007/0283273 A1 | 12/2007 | Woods |
| 2007/0288364 A1 | 12/2007 | Gendler |
| 2007/0288370 A1 | 12/2007 | Konja |
| 2007/0299736 A1 | 12/2007 | Perrochon et al. |
| 2008/0015927 A1 | 1/2008 | Ramirez |
| 2008/0033878 A1 | 2/2008 | Krikorian et al. |
| 2008/0052226 A1 | 2/2008 | Agarwal et al. |
| 2008/0052343 A1 | 2/2008 | Wood |
| 2008/0097933 A1 | 4/2008 | Awaida et al. |
| 2008/0114709 A1 | 5/2008 | Dixon et al. |
| 2008/0134043 A1 | 6/2008 | Georgis et al. |
| 2008/0140524 A1 | 6/2008 | Anand et al. |
| 2008/0140564 A1 | 6/2008 | Tal et al. |
| 2008/0147506 A1 | 6/2008 | Ling |
| 2008/0168543 A1 | 7/2008 | von Krogh |
| 2008/0168544 A1 | 7/2008 | von Krogh |
| 2008/0172270 A1 | 7/2008 | Eckenroth |
| 2008/0177663 A1 | 7/2008 | Gupta et al. |
| 2008/0183574 A1 | 7/2008 | Nash et al. |
| 2008/0183757 A1 | 7/2008 | Dorogusker et al. |
| 2008/0189186 A1 | 8/2008 | Choi et al. |
| 2008/0195506 A1 | 8/2008 | Koretz et al. |
| 2008/0201643 A1 | 8/2008 | Nagaitis et al. |
| 2008/0208747 A1 | 8/2008 | Papismedov et al. |
| 2008/0221987 A1 | 9/2008 | Sundaresan et al. |
| 2008/0270293 A1 | 10/2008 | Fortune et al. |
| 2008/0275777 A1 | 11/2008 | Protheroe et al. |
| 2008/0320147 A1 | 12/2008 | DeLima et al. |
| 2009/0006995 A1 | 1/2009 | Error et al. |
| 2009/0024469 A1 | 1/2009 | Broder et al. |
| 2009/0037294 A1 | 2/2009 | Malhotra |
| 2009/0132969 A1 | 5/2009 | Mayer |
| 2009/0138379 A1 | 5/2009 | Scheman |
| 2009/0164442 A1 | 6/2009 | Shani et al. |
| 2009/0172551 A1 | 7/2009 | Kane et al. |
| 2009/0241015 A1 | 9/2009 | Bender et al. |
| 2009/0248467 A1 | 10/2009 | Bulman et al. |
| 2009/0259559 A1 | 10/2009 | Carroll et al. |
| 2009/0259574 A1 | 10/2009 | Thomsen et al. |
| 2009/0307134 A1 | 12/2009 | Gupta et al. |
| 2010/0049766 A1 | 2/2010 | Sweeney et al. |
| 2010/0121734 A1 | 5/2010 | Harper et al. |
| 2010/0138297 A1 | 6/2010 | Fitzgerald et al. |
| 2010/0197380 A1 | 8/2010 | Shackleton |
| 2010/0293048 A1 | 11/2010 | Singolda et al. |
| 2010/0299731 A1 | 11/2010 | Atkinson |
| 2010/0306078 A1 | 12/2010 | Hwang |
| 2011/0035289 A1 | 2/2011 | King et al. |
| 2011/0060629 A1 | 3/2011 | Yoder et al. |
| 2011/0117935 A1 | 5/2011 | Cho et al. |
| 2012/0316992 A1 | 12/2012 | Oborne |
| 2013/0074168 A1 | 3/2013 | Hao et al. |

(56) References Cited

U.S. PATENT DOCUMENTS

| | | |
|---|---|---|
| 2013/0136242 A1 | 5/2013 | Ross et al. |
| 2013/0198084 A1 | 8/2013 | Agarwal et al. |
| 2014/0281853 A1 | 9/2014 | Bender et al. |

OTHER PUBLICATIONS

U.S. Appl. No. 11/771,679, filed Jun. 29, 2007, Maynard-Zhang, et al., "Mapping Attributes to Network Addresses."
"PayPal Security Key", retrieved on Jun. 19, 2008 at <<https://www.paypal.com/securitykey>>, PayPal (2 pages).
Quova, retrieved on May 29, 2009 at <<http://www.quova.com/>>, Quova Inc., USA, 5 pgs.
Final Office Action for U.S. Appl. No. 12/147,876, mailed on May 6, 2011, Isaac Oates et al., "Providing Information Without Authentication", 11 pages.
Non-Final Office Action for U.S. Appl. No. 12/165,102, mailed on Mar. 8, 2012, James Jesensky et al., "Automatic Approval", 31 pages.
Non-Final Office Action for U.S. Appl. No. 12/035,618, mailed on Apr. 14, 2012, Michal Bryc et al., "Automated Targeting of Content Components", 31 pages.
Office action for U.S. Appl. No. 12/165,102, mailed on Apr. 1, 2011, Jesensky, James, "Automatic Approval".
Non-Final Office Action for U.S. Appl. No. 12/147,876, mailed on May 6, 2011, Isaac Oates, "Providing Information Without Authentication".
Final Office Action for U.S. Appl. No. 12/035,618, mailed on Aug. 2, 2011, Michal Bryc, "Automated Targeting of Content Components".
Apache HBase, Chapter 8 Architecture, retrieved from <<http://hbase.apache.org/book.html#architecture>>, available as early as Nov. 30, 2011, Apache Software Foundation, 8 pages.
Chang et al, "Bigtable: A Distributed Storage System for Structured Data," 7th USENIX Symposium on Operating Systems Design and Implementation, OSDI '06, Nov. 2006, 14 pages.
Fielding et al, "Hypertext Transfer Protocol—HTTP/1.1", Network Working Group, W3C/MIT, Jun. 1999, http://tools.ietf.org/pdf/rfc2616.pdf, 114 pages.
Howstuffworks, "What is a packet?", http//web.archive.org/web/20060708154355/http://computer.howstuffworks.com/question525.htm, last retrieved Sep. 1, 2011, 2 pages.
Final Office Action for U.S. Appl. No. 12/165,102, mailed on 9/13/11, James Jesensky, "Automatic Approval", 31 pages.
Wikipedia, HTTP cookie, "http://web.archive.org/web/20080227064831/http://en.wikipedia.org/wiki/HTTP_cookie", last retrieved Sep. 1, 2011, 18 pages.
Wikipedia, MSISDN, http://web/archive.org/web/20071029015418/http://en.wikipeida.org/wiki/MSISDN, last retrieved Sep. 1, 2011, 3 pages.
Final Office Action for U.S. Appl. No. 12/165,102, mailed on Nov. 8, 2013, James Jesensky, "Automatic Approval", 37 pages.
Office action for U.S. Appl. No. 12/165,102, mailed on May 17, 2013, Jesensky et al, "Automatic Approval", 42 pages.
Non-Final Office Action for U.S. Appl. No. 12/165,102, mailed on Jul. 3, 2012, Jesensky James et al., "Automatic Approval", 30 pages.
Final Office Action for U.S. Appl. No. 12/035,618, mailed on Oct. 22, 2012, Michal Bryc et al., "Automated Targeting of Content Components", 39 pages.
Office action for U.S. Appl. No. 12/165,102, mailed on Nov. 9, 2012, Jesensky et al., "Automatic Approval", 36 pages.
Office Action for U.S. Appl. No. 12/544,940, mailed on Jun. 11, 2014, Matthew T. Williams, "Providing Localized Delivery Information Without Authentication", 15 pages.
Office action for U.S. Appl. No. 12/147,876, mailed on Sep. 24, 2015, Oates et al., "Providing Information Without Authentication", 19 pages.
Final Office Action for U.S. Appl. No. 12/544,940, mailed on May 19, 2015, Matthew T. Williams, "Providing Localized Delivery Information Without Authentication", 16 pages.
Office action for U.S. Appl. No. 12/544,940, mailed on Mar. 24, 2016, Williams et al., "Providing Localized Delivery Information Without Authentication", 10 pages.
Office action for U.S. Appl. No. 12/147,876, mailed on Apr. 15, 2016, Oates et al., "Providing Information Without Authentication", 18 pages.
Office action for U.S. Appl. No. 14/336,258, mailed on May 19, 2016, Jesensky et al., "Automatic Approval", 32 pages.

* cited by examiner

CONDUCTING TRANSACTIONS WITH DYNAMIC PASSWORDS

BACKGROUND

Companies utilizing e-commerce sites strive to make their sites easier for users to locate and purchase items. To help users locate items, for instance, these sites may categorize products into varying categories of an electronic catalog. In order to ease users' ability to purchase items, meanwhile, these companies may configure their sites to accept many forms of payment. While many of these strategies have increased the effectiveness of these sites, companies continually strive to further enhance user experiences.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed, in part, to allowing a user to engage in a transaction using a password (e.g., a dynamic password) and an identifier linked with a payment instrument. In some instances, the identifier linked with the payment instrument is free from information identifying the payment instrument. Therefore, the user associated with the identifier (and potentially the linked payment instrument) may more freely share the identifier than an actual payment instrument identifier. That is, the user may more freely share the identifier linked to the payment instrument when compared with sharing credit card numbers, bank account numbers, gift card numbers, and the like.

In some instances, the identifier linked with the payment instrument comprises a set of numeric or alphanumeric characters having a secondary meaning to the user (e.g., "Grace's Textbooks", "Griffin's Toys", etc.). Many other identifiers may similarly be employed, each of which may be linked to one or more payment instruments, such as a credit card, bank account, gift card, and the like.

To authenticate an identifier linked with a payment instrument, the user may provide a password, such as a dynamic password, that is unique to the identifier. The dynamic password may comprise a one-time password or may comprise another secure password that may be used more than once. A one-time password, for instance, may comprise a password that is valid for a specific amount of time (e.g., sixty seconds) or for a specific number of uses (e.g., one). The one-time password may be uniquely generated based on a random number generating process, a mathematical algorithm, and/or based on any other known or novel methods. While this discussion refers to examples with reference to one-time passwords, other dynamic passwords may, in some instances, be employed more than once. For instance, if a particular dynamic password is time-based and changes every sixty seconds, the one-time password may conceivably be employed more than once during these sixty seconds. However, in these and other instances, a dynamic password may only be used for a single transaction, at which point a new dynamic password may be generated for future transactions made with the corresponding identifier. Again, while the discussion uses a one-time password to describe certain implementations, other implementations may use one or more other forms of dynamic passwords.

The discussion begins with a section entitled "Illustrative Architecture," which describes one non-limiting environment that may allow users to conduct transactions with one-time passwords. A section entitled "Illustrative User Interfaces" follows. This section depicts and describes illustrative examples of user interfaces (UIs) that may be served to and rendered at the device of the user of FIG. 1. A third and final section, entitled "Illustrative Flow Diagrams," concludes the discussion and steps through an illustrative process of employing the described techniques.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. One example implementation and context is provided with reference to the following figures, as described below in more detail. However, the following implementation and context is but one of many.

Illustrative Architecture

Figure 1:
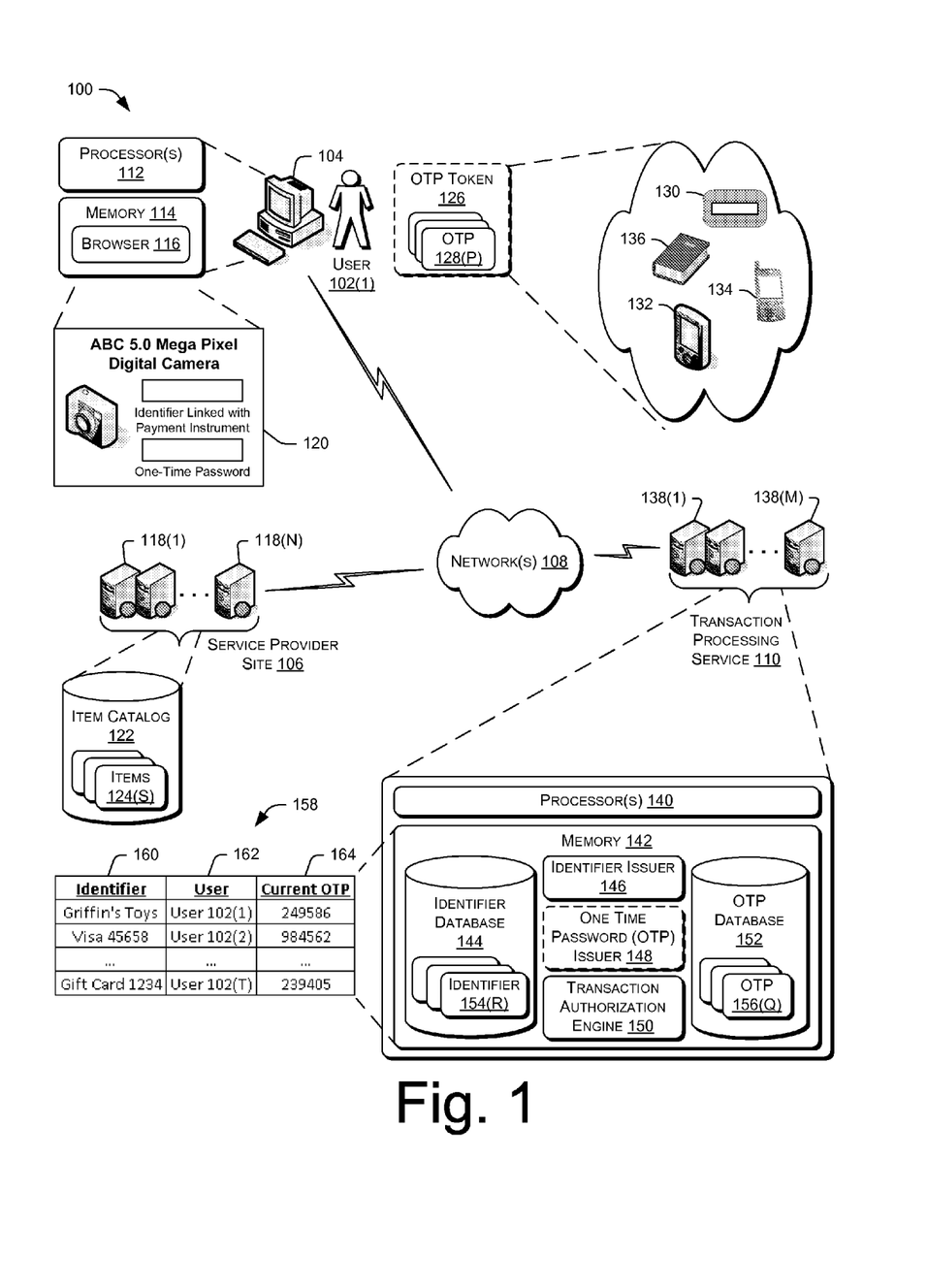
FIG. 1 illustrates an example architecture for conducting transactions using dynamic passwords, such as one-time passwords. This example architecture illustrates a user operating a computing device to access a site of a service provider to engage in a transaction with the provider with use of an illustrative type of dynamic password known as a "one-time password." For example, the user may attempt purchase an item offered for sale by the service provider by providing an identifier linked with a payment instrument and a one-time password. The service provider, meanwhile, may leverage a transaction processing service that approves or declines the transaction (e.g., the purchase of the item) based on the received identifier and the received one-time password.

FIG. 1 illustrates an example architecture 100 that may enable use of dynamic passwords to engage in a transaction with a service provider. In some instances, architecture 100 allows users to engage in such transactions using an identifier that is linked with a payment instrument yet is free from information identifying the payment instrument. In these instances, the dynamic password may be used to authenticate the provided identifier.

Here, the techniques are described in the context of a user 102(1) operating a computing device 104 to access a service provider site 106 over a network 108. For instance, user 102(1) may use device 104 to access site 106 for purposes of engaging in a transaction with the service provider.

Architecture 100 also includes a transaction processing service 110 configured to manage the requested transaction. While service provider site 106 and transaction processing service 110 are illustrated in the current example as separate entities, the service provider and processing service 110 may comprise the same entity or may employ similar or the same functionality in other embodiments. Furthermore, the described techniques themselves may be implemented in a vast number of other environments and architectures.

In architecture 100, site 106 may comprise any sort of site that supports user interaction, including social networking sites, e-commerce sites, informational sites, news and entertainment sites, and so forth. Additionally, the site is representative of proprietary sites that receive requests and provide content over proprietary networks other than the Internet and public web.

Furthermore, while the illustrated example represents user 102(1) accessing service provider site 106, the described techniques may equally apply in instances where user 102(1) interacts with the service provider over the phone, via a kiosk, or in any other manner. It is also noted that the described techniques may apply in other client/server arrangements, as well as in non-client/server arrangements (e.g., locally-stored software applications, set-top boxes, etc.).

Here, user 102(1) accesses content site 106 via network 108. Network 108 may include any one or combination of multiple different types of networks, such as cable networks, the Internet, and wireless networks. User computing device 104, meanwhile, may be implemented as any number of computing devices, including as a personal computer, a laptop computer, a portable digital assistant (PDA), a mobile phone, a set-top box, a game console, a personal media player (PMP), and so forth. User computing device 104 is equipped with one or more processors 112 and memory 114 to store applications and data. An application, such as a browser 116 or other client application, running on device 104 facilitates access to site 106 over network 108.

Site 106 is hosted on one or more servers 118(1), . . . , 118(N) having processing and storage capabilities. In one implementation, the servers might be arranged in a cluster or as a server farm, although other server architectures may also be used to host the site. The site is capable of handling requests from many users and serving, in response, various pages of content that can be rendered at user computing device 104 for viewing by user 102(1). For instance and as illustrated, site 106 may serve a page 120 to computing device 104. Page 120 may comprise any sort of content, such as an item for sale, a user profile, a search page, a discussion forum, and/or any other type of page.

As illustrated, servers 118(1)-(N) may store or otherwise have access to an item catalog 122 comprising one or more items 124(1), . . . , 124(S). An item includes anything that the service provider wishes to offer for purchase, rental, subscription, viewing, informative purposes, or some other form of consumption. In some embodiments the item may be offered for consumption by the service provider hosting site 106. However, in other embodiments service provider site 106 may host items that others are selling using the site 106. An item can include a product, a service, a digital download, a news clip, customer-created content, information, or some other type of sellable or non-sellable unit.

In the illustrated example, page 120 (rendered at device 104) includes content served by service provider site 106, as well as content served by transaction processing service 110. Both sets of content may comprise any sort of content capable of being visually, audibly, or otherwise consumed by user 102(1). In instances where the service provider that hosts site 106 comprises an e-commerce site, the content provided by site 106 may comprise one or more items for consumption by user 102(1). For example, this content may comprise an item for sale, rent, download, viewing, listening, or for any other type of consumption.

The content provided by service 110, meanwhile, may comprise content that enables user 102(1) to enter into a transaction with the service provider hosting site 106. In instances where site 106 comprises an e-commerce site, for example, this content may comprise a widget that allows user 102(1) to enter into a transaction with the service provider to consume or obtain an item provided by site 106. For instance, this widget may allow user 102(1) to purchase an item for sale by service provider site 106 and illustrated on page 120.

To engage in such a transaction, such as the purchase of an illustrated item, user 102(1) may provide an identifier linked with a payment instrument. User 102(1) may also provide a dynamic password for authenticating the identifier. The identifier linked with the payment instrument may actually identify the payment instrument or, alternatively, may be free from information identifying the linked payment instrument. In the former instances, the identifier may comprise a credit card number, a bank account number, a gift card number, and/or any other identifier that is linked with and identifies a payment instrument.

In the latter instances, meanwhile, the identifier may comprise proxy for the linked payment instrument. For instance, the identifier provided by user 102(1) may comprise a transaction phrase token. As described in U.S. Provisional Application No. 60/823,611, filed on Aug. 25, 2006, and U.S. patent application Ser. No. 11/548,111, filed on Oct. 10, 2006, both entitled UTILIZING PHRASE TOKENS IN TRANSACTIONS and both incorporated herein by reference, a transaction phrase token may comprise a set of characters that has a secondary meaning to user 102(1) or to another user associated with the transaction phase token. In addition to comprising a phrase (e.g., "Grace's Textbook", "Griffin's Toys", "My Online Spending $"), the transaction phrase token may also take the form of a physical card (e.g., similar in size and shape to a credit card). Whatever its form, the transaction phrase token may link to a payment instrument, such as a bank account or a credit card. For example, a transaction phrase token associated with user 102(1) may link with a payment instrument (e.g., a credit card) of user 102(1) or some other person or entity. Therefore, user 102(1) (and potentially one or more other users) may employ this transaction phrase token as a payment method for future purchases.

Furthermore, transaction phrase tokens may be associated with certain rules that dictate when and how a user may employ a transaction phrase token for purchases. Similarly, the user that controls the transaction phrase token (e.g., the person associated with the underlying payment instrument, such as the credit card holder) may differ from a user of the token. For instance, a mother may create a token for her daughter ("Grace") entitled "Grace's Textbooks". Once the mother creates or approves creation of the token, Grace may then specify this token as a payment method. By identifying this token as a payment method, the daughter thus identifies the mother (i.e., the person associated with the linked payment instrument) as the payer for these purchases. When initiating the transaction, in some embodiments it is not required that the phrase token user authenticates. Rather, the transaction can be initiated and then, if needed, subsequent authorization (e.g. by authenticating the user that controls the token) can be performed.

Similar to the discussion above, this transaction phrase token may be associated with predefined rules. For instance, the mother may create a rule that pre-approves purchases of certain categories of items, such as textbooks. The mother may also employ other rules, such as dollar amounts, time limits, and the like. In these instances, when the daughter uses the token as a payment method, the transaction processing service 110 may compare the parameters of the requested purchase with the rules associated with the token. The service may then complete or cancel the requested purchase according to the token's rules. Conversely or additionally, service 110 may notify the user that controls use of the token (here, the mother) to request that he or she approve or deny the requested purchase. The user that controls the use of the token may, in some cases, be requested to authenticate themselves in some way, such as through a username and password in order to approve the transaction of the token user.

Because transaction phrase tokens may merely comprise a string of characters that is free from information identifying a linked payment instrument, such tokens may be more freely shared than when compared with other types of payment instrument identifiers, such as credit card numbers, bank account numbers, and the like. However, due to the more lenient nature of transaction phrase tokens, transaction processing service 110 may take special care to ensure that a user that employs the token to conduct a transaction actually has authority to do so. For instance, imagine that user 102(1) is associated with and controls a transaction phrase token. When user 102(1) requests to conduct a transaction, transaction processing service 110 may ensure that user 102(1) actually has authority to conduct transactions with the provided transaction phrase token.

To ensure that user 102(1) has authority to employ a particular identifier, in some embodiments, user 102(1) may be asked to provide a dynamic password (e.g., a one-time password in this example) in addition to providing the identifier. Transaction processing service 110 may then compare this provided one-time password with a derived, stored or accessible one-time password associated with the provided identifier. If these one-time passwords match, then service 110 may approve the transaction. If, however, these passwords do not match, then service 110 may decline the transaction or may implement further authorization steps. While the discussion describes the matching or comparing of the passwords, it is to be appreciated that these terms include comparing the passwords themselves or otherwise determining if the received password is the same as the accessible password. For instance, service 110 may compare hash functions of the password(s), encryption versions of the password, and the like.

In order to authenticate an identifier, such as a transaction phrase token, with use of a dynamic password such as a one-time password, both user 102(1) and transaction processing service 110 may need to know the currently-valid dynamic password associated with the identifier. As described in detail below, service 110 may derive, store or otherwise have access to this currently-valid password as it changes with time or with various events. User 102(1), meanwhile, may determine this currently-valid one-time password in a number of ways. Again, while the following discussion i For instance, user 102(1) may have access to a one-time password (OTP) token 126 configured to generate one or more one-time passwords (OTPs) 128(1), . . . , (P) associated with a particular identifier (e.g., a credit card number, a transaction phrase token, etc.). While the current example describes one-time passwords, other implementations may use one or more other forms of dynamic passwords. In any event, one such token generator embodied as a hardware device is the SecurID® token developed by RSA of Bedford, Mass. However, it should be understood that such tokens may be software based as well. Indeed, the token could also comprise a book of pre-generated one-time passwords as discussed below. Each of one-time passwords 128(1)-(P) may comprise a pseudo-random identifier, such as a string of numeric or alphanumeric characters.

Token 126, meanwhile, may comprise any sort of device or article capable of providing a one-time password. Furthermore, token 126 may be a time-based and/or a sequence-based token. A time-based token changes a one-time password after the passage of a predetermined amount of time (e.g., fifteen seconds, one minute, one hour, etc.). A sequence-based token, meanwhile, changes a password after a predetermined event, such as the user choosing to change the password or the use of the password.

As illustrated, token 126 may take many forms. For instance, token 126 may comprise a key fob 130, a personal digital assistant (PDA) 132, a mobile phone 134, or even a book 136, just to name a few. Using the example of key fob 130, this token may function to periodically generate a one-time password after the passage of a predetermined time interval. PDA 132 and mobile phone 134 may include software to do the same. That is, service 110 and/or user 102(1) may install software on PDA 132 or mobile phone 134 for the purpose of generating unique one-time passwords associated with a particular identifier. Book 136, meanwhile, may simply contain a listing of one-time passwords to be used in sequence by user 102(1). While a few illustrative tokens have been discussed, it is to be appreciated that token 126 may take many other forms.

As opposed to gaining access to one-time passwords 128(1)-(P) via token 126, user 102(1) may receive these passwords in other ways. For instance, user 102(1) may receive a one-time password from transaction processing service 110, on demand or otherwise. That is, when user 102(1) wishes to conduct a transaction with, for example, service provider site 106, user 102(1) may request a one-time password from service 110. To do so, user 102(1) may send a short message service (SMS) text message, send an email message, call or otherwise communicate with service 110. This or a subsequent communication may provide another password or personal identification number (PIN) to authenticate the user with service 110. In response, service 110 may provide one of the one-time passwords 128(1)-(P) to user 102(1). For instance, service 110 may send the one-time password to user 102(1) via an SMS text message, an email message, a phone call, physical delivery and/or via any other delivery method.

Once user 102(1) receives a one-time password (via service 110, token 126, or otherwise), user 102(1) may provide an identifier linked with a payment instrument and the one-time password to service 110 for the purpose of conducting a transaction with site 106. At this point, service 110 may attempt to authenticate the identifier by comparing the received one-time password with a one-time password associated with the received identifier and stored or accessible by service 110.

In the illustrated example, service 110 is hosted by one or more servers 138(1), ..., (M). Servers 138(1)-(M) comprise one or more processors 140 as well as memory 142. Memory 142 may store or otherwise have access to an identifier database 144, an identifier issuer 146, a one-time password (OTP) issuer 148, a transaction authorization engine 150, and a one-time password (OTP) database 152.

Identifier database 144 stores or has access to one or more identifiers 154(1), ..., (R), each of which may be linked with one or more payment instruments. Furthermore, each of identifiers 154(1)-(R) may or may not be free of information identifying the respective linked payment instrument(s). For instance, these identifiers may include credit card numbers, bank account numbers, transaction phrase tokens, and the like. Identifier issuer 146, meanwhile, may issue some these identifiers to users, such as user 102(1). For instance, issuer 146 may issue transaction phrase tokens to one or more users. In the current example, identifier database 144 stores an identifier corresponding to an identifier associated with user 102(1).

One-time password (OTP) issuer 148, meanwhile, may function to issue one-time passwords to users, such as user 102(1). For instance, issuer 148 may issue these passwords via SMS text messages, email messages, a phone call, or the like.

One-time password (OTP) database 152 stores one or more one-time passwords 156(1), ..., (Q), regardless of whether OTP issuer 148 provided the password directly or not. Each of passwords 156(1)-(6) corresponds to a particular identifier. Therefore, both a user authorized to conduct a transaction with a particular identifier and transaction processing service 110 know the currently-valid one-time password for the particular identifier.

To illustrate, FIG. 1 depicts a table 158 storing associations between identifiers 160, users 162 of the identifiers, and current one-time passwords 164 of the identifiers. For instance, table 158 shows that an identifier associated with user 102(1) comprises a transaction phrase token entitled "Griffin's Toys". As discussed above, this token may be linked with a payment instrument (e.g., a credit card, bank account, etc), although the token does not actually identify the payment instrument.

Furthermore, table 158 illustrates several identifiers that do identify the linked payment instrument, such as "Visa® 45658" (identifying some or all of this fictional credit card's number) and "Gift Card 1234" (again, identifying some or all of this fictional gift card's number. Finally, table 158 illustrates currently-valid one-time passwords 164 corresponding to respective identifiers 160. For instance, the identifier "Griffin's Toys" (corresponding to user 102(1)) is shown to have a current password of "249586". While this example employs a pseudo-random number for a password, other passwords may take other forms. Furthermore, when this one-time password "249586" expires (e.g., due to use of the password or due to the passage of time), then a new one-time password may be associated with the identifier "Griffin's Toys".

With the information illustrated in table 158, transaction authorization engine 150 is able to receive an identifier and a one-time password from a user and, in response, compare the received password with a stored and currently-valid one-time password for the received identifier. In some instances, service 110 may approve a requested transaction if these passwords match. Furthermore, service 110 may decline or implement additional authorization mechanisms in response to determining that the passwords do not match.

Illustrative User Interfaces

Figure 2:
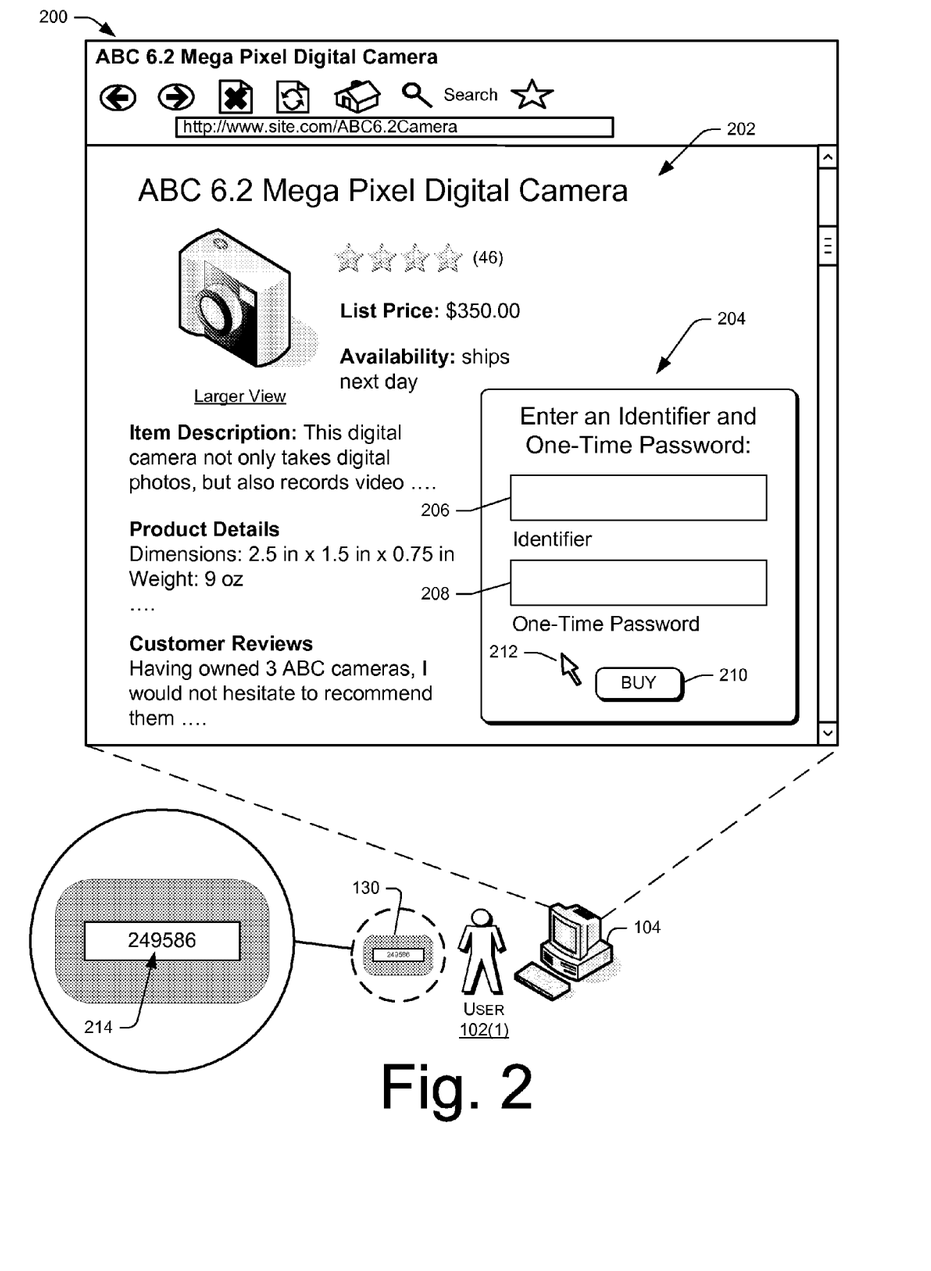
FIG. 2 illustrates an example screen rendering of a page served by the service provider of FIG. 1. Here, the example page includes a widget provided by the transaction processing service of FIG. 1. The widget allows the user to enter an identifier linked with a payment instrument and a one-time password for the purpose of requesting to purchase the illustrated item.
Figure 3:
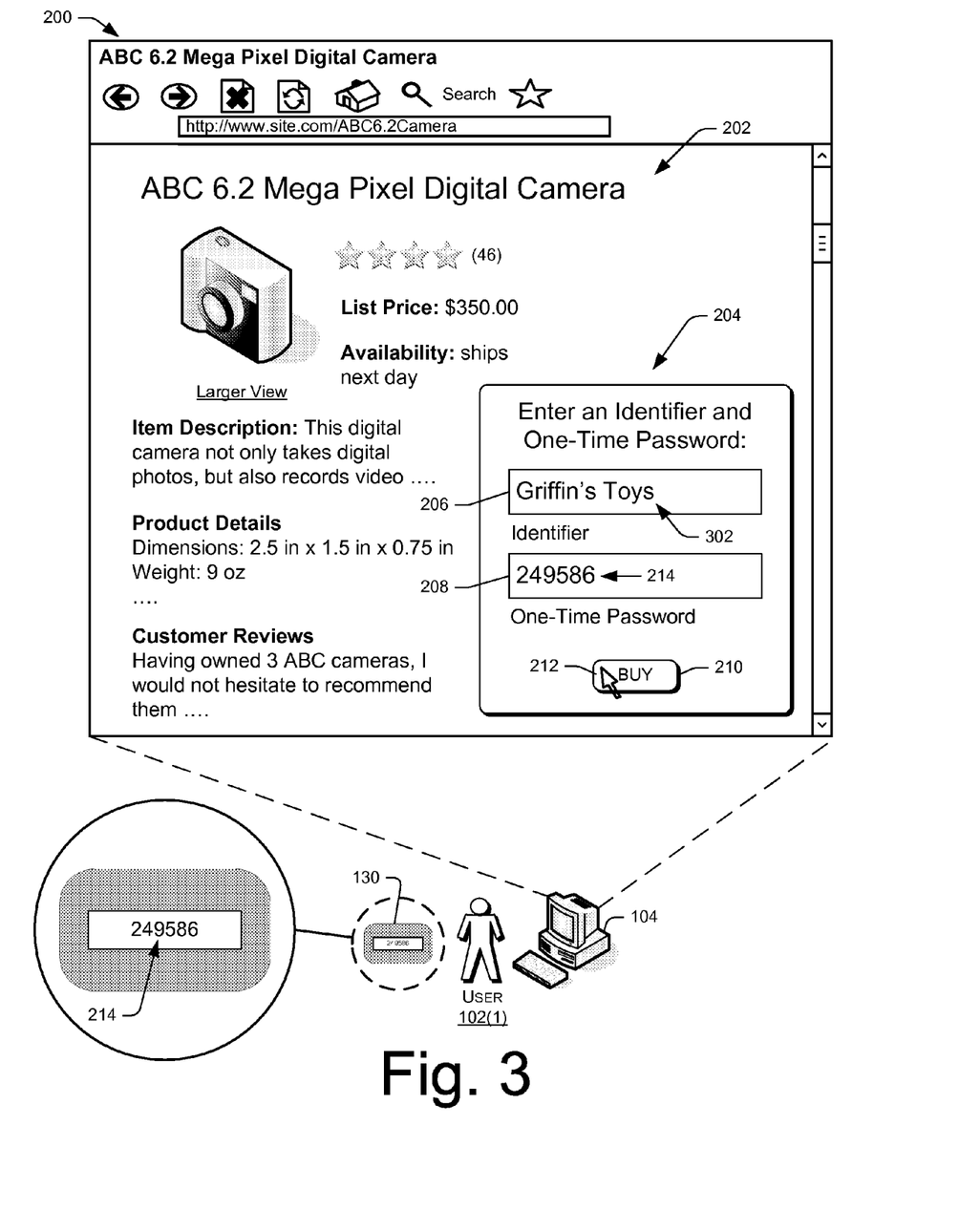
FIG. 3 illustrates the example screen rendering of the page from FIG. 2 after the user has entered an identifier and a one-time password into respective text boxes of the widget.
Figure 4:
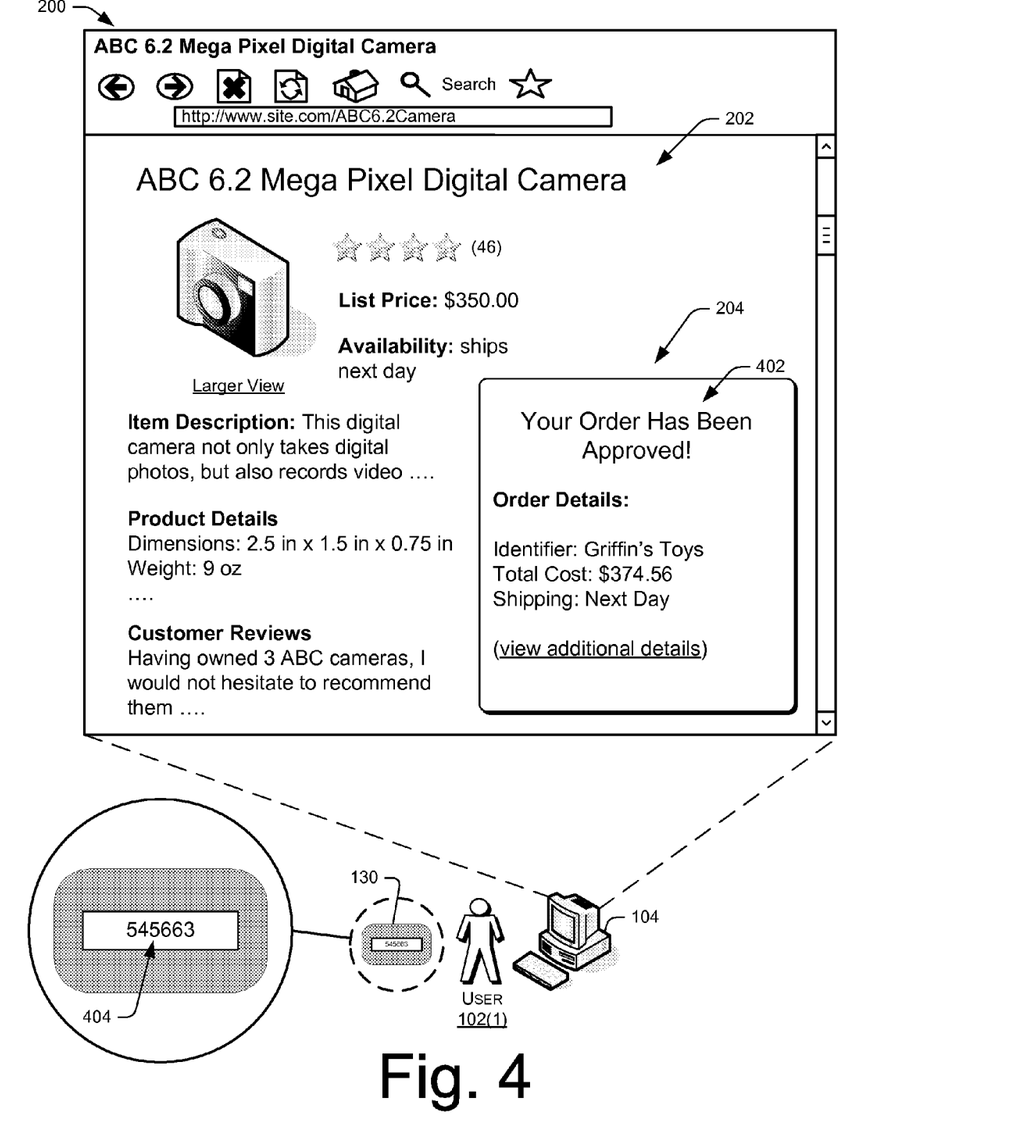
FIG. 4 illustrates the example screen rendering of the page from FIGS. 2 and 3 after the user has selected the "buy" icon from the widget of FIGS. 2 and 3. Here, the transaction processing service has authenticated the provided identifier (using the provided password). Hence, the widget includes content indicating that the order has been approved.

FIGS. 2-4 illustrate example user interfaces (UIs) that may be used to allow a user to conduct a transaction using an identifier linked with a payment instrument and a one-time password. However, these UIs are merely illustrative and the techniques described above and below may be employed using other UIs, without UIs, or a combination thereof.

FIG. 2 illustrates an example screen rendering of a page 200 served by service provider site 106 as well as transaction processing service 110 of FIG. 1. As illustrated, page 200 may be served to device 104 from FIG. 1. Here, page 200 comprises an item detail page associated with an item and, hence, includes details about the illustrated item for sale. As discussed below, an "item detail page" may include details such as price, product rating, product description, and the like. It is further noted that page 200 includes content 202, served by the service provider, as well as a widget 204, whose content is served by transaction processing service 110. Here, widget 204 allows the user to enter an identifier linked with a payment instrument and a one-time password for the purpose of engaging in a transaction with service provider site 106. For instance, widget 204 may allow the user to request to purchase the illustrated camera from the service provider.

Content 202 includes an illustration of an "ABC 6.2 Mega Pixel Digital Camera" for sale by the service provider. While content 202 illustrates a physical good in the form of a camera, content 202 could similarly illustrate one or more alternative or additional items for sale or consumption. Again, an item can include a product, a service, a digital download, a news clip, customer-created content, information, or some other type of sellable or non-sellable unit. Content 202 further includes details about the camera. The illustrated details about the camera include a rating, a price, availability, a description, specifications and customer reviews. Of course, the illustrated details are included for context only and other implementations may employ more or less information than the illustrated implementation.

Widget 204, meanwhile, includes text boxes 206 and 208 and an icon 210 entitled "Buy". Text box 206 allows a user, such as user 102(1), to enter an identifier linked with a payment instrument. Text box 208, meanwhile, allows user 102(1) to enter a dynamic password, such as a one-time password in the current example. Once user 102(1) has entered an identifier and a one-time password into the corresponding text boxes, user 102(1) may then select icon 210 (e.g., with a cursor 212) to request to purchase the illustrated camera from the service provider. In the illustrated example, this request and the corresponding identifier and password are submitted to transaction processing service 110 in response to selection of icon 210. While FIG. 2 depicts text boxes 206 and 208 as separate text boxes, other implementations may use a single text in which a user may enter both an identifier and a password, such as a dynamic password.

FIG. 2 also illustrates that user 102(1) has a one-time password token in the form of key fob 130 from FIG. 1. In this example, key fob 130 continually generates a unique one-time password after passage of a predetermined amount of time, such sixty seconds. At the illustrated moment in time, key fob 130 displays a one-time password 214 of "249586". Note that transaction processing service 110 or another entity may have previously provided key fob 130 to user 102(1). In both instances, transaction processing service 110 is able to derive whether the one-time password is valid, using mathematical algorithms or by storing or otherwise having access to the one-time passwords associated with the identifier(s) of user 102(1). As such, at the illustrated moment in time, service 110 may also know that the currently-valid one-time password for "Griffin's Toys" (the identifier associated with user 102(1) in the current example) is indeed password 214 (249586).

FIG. 3 illustrates page 200 after user 102(1) has entered the identifier 302 ("Griffin's Toys") into text box 206. User 102(1) has also entered one-time password (249586) into text box 208. Finally, FIG. 3 also illustrates that user 102(1) then selects icon 210 to request to purchase the illustrated camera. At this point, the request to purchase the camera is sent to service 110, potentially along with the entered identifier and password, as well as details about the requested purchase. Upon receipt of the request, transaction processing service 110 may in some instances determine whether rules associated with the entered identifier (here, a transaction phrase token) allow the requested transaction.

Furthermore, upon receipt of the identifier and the one-time password, service 110 may access a currently-valid one-time password associated with the received identifier. Service 110 (and, more particularly, transaction authorization engine 150) may determine whether the password is valid by, for example, comparing received password 214 against the password stored or accessible by service 110, among other methods. If these passwords are valid, then service 110 may approve the requested transactions. If these passwords are not valid, then service 110 may deny the transactions, take additional authorization steps, and/or may take another course of alternative action.

FIG. 4 illustrates page 200 after the request to purchase the camera has been sent to transaction processing service 110 and after service 110 has compared received one-time password 214 to the one-time password stored or accessible by the service. As illustrated, widget 204 displays an indication 402 that the requested purchase has been approved. As such, service 110 may have determined that the passwords did indeed match and, in some instances, that rules associated with the received transaction phrase token did indeed allow for the purchase. Here, widget 204 also depicts some illustrative but non-limiting order details.

Finally, FIG. 4 illustrates that, due to the passage of time, key fob 130 now displays a new one-time password 404 ("545663") associated with identifier 302 ("Griffin's Toys"). Therefore, if user 102(1) were to wish to purchase another item or engage in another transaction using identifier 302 at the illustrated moment in time, according to some embodiments, user 102(1) can use new password 404.

Illustrative Flow Diagrams

Figure 5:
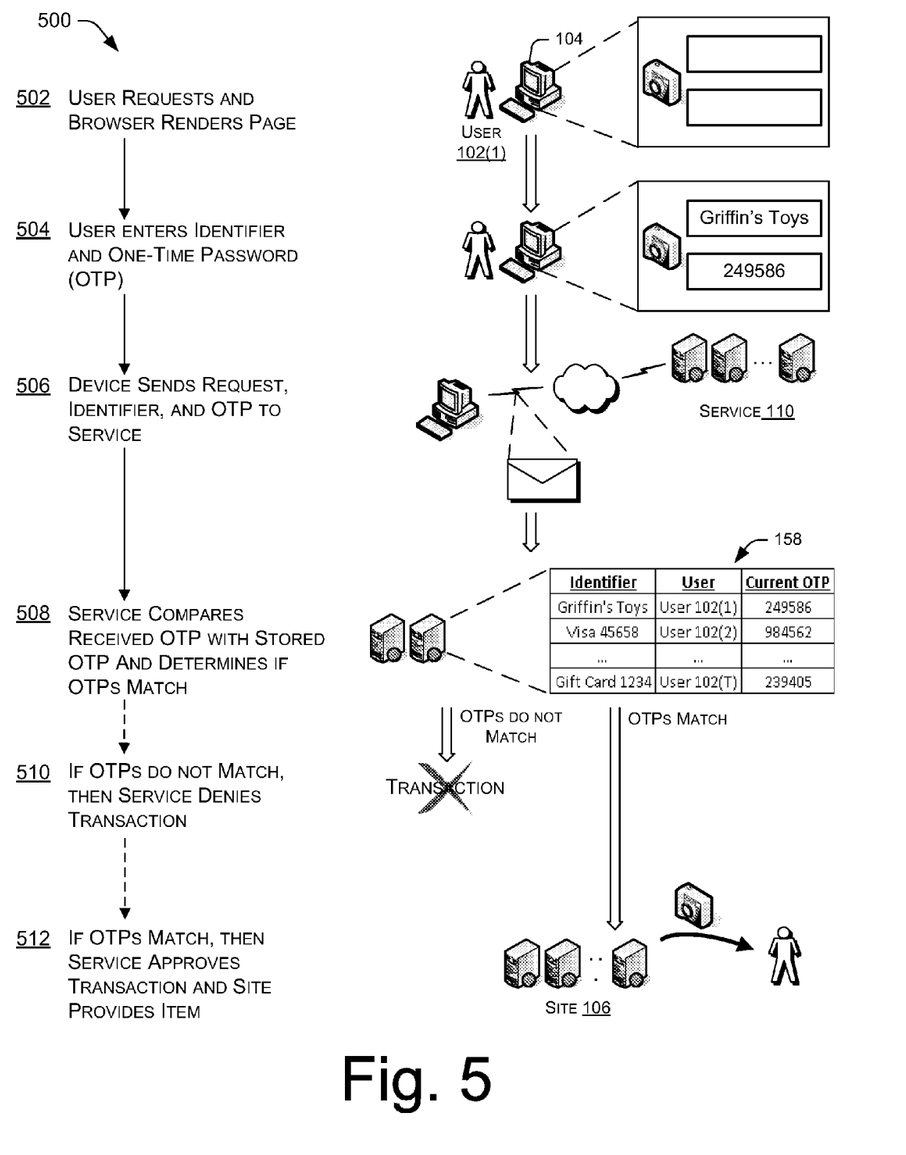
FIG. 5 illustrates an example process that includes the user requesting to engage in a transaction with the service provider of FIG. 1 using a dynamic password, here a one-time password.

FIG. 5 illustrates an example process 500 that includes the user requesting to engage in a transaction with the service provider of FIG. 1 using a dynamic password such as a one-time password. Again, while the process is described with reference to a one-time password, this process is equally applicable to one or more other forms of dynamic passwords. While process 500 is described with reference to architecture 100, the described techniques may be equally applicable in many other architectures and environments. Furthermore, the described process can be implemented in hardware, software, or a combination thereof. In the context of software, the illustrated operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Process 500 includes operation 502, which represents user 102(1) operating computing device 104 to navigate to service provider site 106. While FIG. 5 illustrates the described techniques in the context of client-server navigation, it is again noted that the described techniques may be equally applicable in other contexts. Next, operation 504 represents user 102(1) entering an identifier linked with a payment instrument (e.g., a credit card number, a bank account number, a transaction phrase token) and a one-time password into a widget or other tool provided by transaction processing service 110. Continuing the example from above, user 102(1) here requests to purchase the illustrated camera.

The identifier that user 102(1) enters into the widget or tool may or may not identify the linked payment instrument. User 102(1) may receive or know of the proper one-time password, meanwhile, through any of the methods discussed above or otherwise. For instance, user 102(1) may have a one-time password (OTP) token or may have received the one-time password from service 110 or another entity.

At operation 506, user 102(1) elects to purchase the item, at which point device 104 (and/or an application stored thereon, such as browser 116) sends the entered identifier and one-time password to transaction processing service 110. Upon receiving the request, as well as the identifier and password, service 110 compares (at operation 508) the received one-time password with a one-time password stored at or accessible by service 110.

If the one-time passwords do not match, then service 110 may deny the requested transaction at operation 510. Alternatively, the service may implement other authorization procedures. If, however, the passwords do indeed match one another, then service 110 may approve the requested transaction at operation 512. Responsive to the approval and processing of the transaction, the service provider hosting site 106 may provide user 102(1) with the purchased item, here the illustrated camera.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A transaction processing system having increased security, the system comprising:
one or more first processors;
first memory configured to be in communication with the one or more processors;
first computer-executable instructions that, when executed on the one or more processors, perform acts to securely process a transaction for an item without receiving sensitive information, the acts comprising:
receiving, over a network from a computing device and by the transaction processing system, first data comprising a request to conduct the transaction for the item, wherein the computing device comprises one or more second processors, a second memory, a presentation device, and second computer-executable instructions;

receiving second data comprising a first dynamic password and a transaction phrase token, wherein the transaction phrase token: (i) comprises at least two grammatically correct words, each grammatically correct word separated by a space, (ii) is associated with one or more predefined rules specifying an item category or a transaction amount that is allowed when employing the transaction phrase token to conduct the transaction, and (iii) links to a payment instrument so that the transaction phrase token acts as a proxy for the payment instrument;

accessing a second dynamic password accessible by the transaction processing service;

accessing the one or more predefined rules associated with the transaction phrase token;

based at least partly on the second dynamic password and the one or more predefined rules, triggering the one or more first processors to perform one of:
approving the transaction based at least partly on:
(i) the first dynamic password matching the second dynamic password, and
(ii) at least one of the amount of the transaction being at or below the transaction amount specified by a first predefined rule of the one or more predefined rules or the item category of the item matching the item category specified by a second predefined rule of the one or more predefined rules;
declining the transaction based at least in part on at least one of the first dynamic password not matching the second dynamic password, the amount of the transaction being above the transaction amount specified by the first predefined rule of the one or more predefined rules, or the item category of the item not matching the item category specified by the second predefined rule of the one or more predefined rules; or
implementing one or more other authorization procedures based at least in part on at least one of the first dynamic password not matching the second dynamic password, the amount of the transaction being above the transaction amount specified by the first predefined rule of the one or more predefined rules, or the item category of the item not matching the item category specified by the second predefined rule of the one or more predefined rules.

2. A system as recited in claim 1, wherein the second dynamic password comprises a pseudo-random identifier that changes after a predetermined amount of time.

3. A system as recited in claim 1, wherein the second dynamic password comprises a pseudo-random identifier that changes after a predetermined event.

4. A system as recited in claim 1, wherein:
the second dynamic password is configured to change after one of the group comprising a predetermined amount of time and a predetermined event; and
the acts further comprising updating the second dynamic password as the second dynamic password changes.

5. A system as recited in claim 1, wherein the request to conduct the transaction comprises a request to purchase the item for sale in an item catalog.

6. A method for securely processing a transaction without receiving sensitive information comprising:
receiving, from a computing device and by a transaction processing service, first data comprising a request to purchase an item;
receiving, by the transaction processing service, second data comprising a dynamic password and an identifier associated with a payment instrument, wherein the identifier:
comprises at least two grammatically correct words separated by a space, and
is associated with one or more predefined rules specifying an item category or a transaction amount that is allowed when employing the identifier to conduct a transaction based on the request to purchase the item;
accessing the one or more predefined rules associated with the identifier;
based at least partly on the dynamic password, the identifier, and at least one of an amount of the transaction or an item category of the item, performing one of:
processing, by the transaction processing service, the request to purchase the item;
declining, by the transaction processing service, the request to purchase the item; or
implementing, by the transaction processing service, one or more other authorization procedures.

7. A method as recited in claim 6, wherein the dynamic password is a first dynamic password, and wherein the transaction processing service processes the request based at least in part on the first dynamic password matching a second dynamic password associated with the identifier.

8. A method as recited in claim 6, wherein processing the request to purchase the item includes transmitting, to a second computing device associated with a different user who shares the identifier with a user associated with the request to purchase the item, third data comprising a notification, and receiving an approval of the request to purchase, and wherein the transaction processing service processes the request based at least in part on receiving the approval.

9. A method as recited in claim 8, further comprising authenticating the different user before processing the request to purchase the item.

10. A method as recited in claim 6, wherein the identifier associated with the payment instrument is free from information identifying the payment instrument.

11. A method as recited in claim 6, wherein the identifier comprising the at least two grammatically correct words comprises a transaction phrase token issued by the transaction processing service and linked with the payment instrument by the transaction processing service.

12. A method as recited in claim 6, wherein the identifier comprising the at least two grammatically correct words comprises a set of characters that has a secondary meaning to a user associated with the identifier.

13. A method as recited in claim 6, wherein the identifier and the dynamic password are received in one of the group comprising a simultaneous manner and an asynchronous manner.

14. A method as recited in claim 6, wherein the request to purchase the item is received from a user, and further comprising transmitting, to a second computing device associated with the user, third data comprising the dynamic password before the receiving of the dynamic password.

15. A method as recited in claim 6, wherein the request to purchase the item is received from a user, and further comprising causing a token to be issued to the user, the token configured to generate the dynamic password.

16. A method as recited in claim 6, wherein the dynamic password comprises a pseudo-random number that changes after one of the group comprising a predetermined time interval and a predetermined event.

17. One or more computing devices comprising:
one or more processors; and
one or more computer-readable media storing computer-executable instructions that, when executed on the one or more processors, perform acts comprising:
receiving, from a computing device and over a network, first data comprising a request to purchase an item;
receiving, via a graphical user interface, second data comprising a dynamic password and an identifier linked with a payment instrument, wherein the identifier:
comprises at least two grammatically correct words separated by a space, and
is associated with one or more predefined rules specifying an item category or a transaction amount that is allowed when employing the identifier to conduct a transaction based on the request to purchase the item; accessing the one or more predefined rules associated with the identifier; based at least partly on the dynamic password, the identifier, and at least one of an amount of the transaction or an item category of the item, performing one of: processing the request to purchase the item; declining the request to purchase the item; or implementing one or more other authorization procedures.

18. A method as recited in claim 6, wherein the item comprises one or more of a product, a service, or a digital download.

19. A method comprising:
receiving, from a computing device and by a transaction processing service, first data associated with a request to conduct a transaction for an item, wherein the request comprises an identifier that is linked with a payment instrument, the identifier being associated with one or more predefined rules specifying an item category or a transaction amount that is allowed when employing the identifier to conduct the transaction and comprising two grammatically correct words separated by a space;
receiving second data associated with the dynamic password;
accessing the one or more predefined rules associated with the identifier; and
processing, by the transaction processing service, the requested transaction based at least in part on the identifier, at least one of the amount of the transaction or the item category of the item satisfying a predefined rule of the one or more predefined rules, and the dynamic password.

20. A method as recited in claim 19, wherein the identifier comprising the two grammatically correct words comprises a set of characters that has a secondary meaning to a user associated with the identifier.

21. A method as recited in claim 19, wherein the dynamic password is a first dynamic password, and wherein the processing the requested transaction is based at least in part on the first dynamic password matching a second dynamic password associated with the identifier.

22. One or more computing devices comprising:
one or more processors; and
one or more computer-readable media storing computer-executable instructions that, when executed on the one or more processors, perform acts comprising:
receiving, from a computing device, first data associated with a request to conduct a transaction for an item, wherein the request includes an identifier that is linked with a payment instrument, the identifier being associated with one or more predefined rules specifying an item category or a transaction amount that is allowed when employing the identifier to conduct the transaction and comprising two grammatically correct words separated by a space;
receiving second data associated with a dynamic password;
accessing at least one of an amount of the transaction or an item category of the item associated with a predefined rule of the one or more predefined rules associated with the identifier; and
based at least in part on the identifier, a comparison between at least one of the amount of the transaction or the item category of the item with the one or more predefined rules, and the received dynamic password, performing one of:
processing the request to conduct the transaction for the item;
declining the request to conduct the transaction for the item; or
implementing one or more other authorization procedures.

23. A system comprising:
one or more processors;
memory;
an identifier issuer, stored in the memory and executable on the one or more processors, to issue a transaction phrase token to a user, the transaction phrase token: (i) comprising two grammatically correct words separated by a space, (ii) being associated with one or more predefined rules specifying an item category or a transaction amount that is allowed when employing the identifier to conduct transactions, and (iii) being linked with a payment instrument such that the transaction phrase token links to the payment instrument as a proxy for the payment instrument; and
a transaction authorization engine, stored in the memory and executable on the one or more processors, to:
receive, from a computing device, first data associated with a request from the user to conduct a transaction for an item;
receive second data associated with a first dynamic password and the transaction phrase token;
access third data associated with a second dynamic password associated with the transaction phrase token; and
determine an approval decision associated with the transaction based at least in part on at least one of an amount of the transaction or an item category of the item complying with a predefined rule of the one or more predefined rules associated with the transaction phrase token.

24. A system as recited in claim 23, wherein the first dynamic password comprises a one-time password.

25. A system as recited in claim 23, wherein determining the approval decision comprises at least one of: (i) approving the requested transaction based on one of the first dynamic password matching the second dynamic password and at least one of the amount of the transaction being at or below the transaction amount specified by the one or more predefined rules, or the first dynamic password matching the second dynamic password and the item category of the item matching the item category specified by the one or more predefined rules, and (ii) declining the requested transaction based on at least one of: the first dynamic password not matching the second dynamic password, the amount of the transaction being above the transaction amount specified by the one or more predefined rules, or the item category of the item not matching the item category specified by the one or more predefined rules.

26. A system as recited in claim 23, wherein the second dynamic password comprises a pseudo-random identifier that changes after one of the group comprising a predetermined time interval and a predetermined event.

27. A system as recited in claim 23, further comprising a dynamic password issuer to issue the dynamic password to the user in response to receiving a request for a dynamic password.

28. A system as recited in claim 23, wherein the request to conduct the transaction further comprises a request to purchase the item from an online item catalog provided by an e-commerce merchant.

29. A method comprising:
    receiving, by a computing device, first data comprising a request to conduct a transaction for an item using an identifier as a proxy for a payment instrument, and a dynamic password, wherein the identifier is associated with one or more predefined rules specifying an item category or a transaction amount that is allowed when employing the identifier to conduct the requested transaction, wherein the identifier comprises two grammatically correct words separated by a space;
    accessing second data associated with at least one of an amount of the requested transaction or an item category of the item that is associated with a predefined rule of the one or more predefined rules associated with the identifier; and
    determine an approval decision associated with the requested transaction based at least in part on the identifier, at least one of the amount of the requested transaction or the item category of the item in relation to the predefined rule of the one or more predefined rules, and the dynamic password.

30. A method as recited in claim 29, wherein the requested transaction comprises a request to purchase the item from an item catalog.

31. A method as recited in claim 29, wherein the identifier is linked with the payment instrument but is free from information identifying the payment instrument.

32. A method as recited in claim 29, wherein the identifier comprising the two grammatically correct words comprises a set of characters that has a secondary meaning to a user associated with the identifier.

33. One or more non-transitory computer-readable media storing computer-executable instructions that, when executed on one or more processors, perform acts comprising:
    receiving, at a transaction processing service and from a computing device, first data associated with a request to purchase an item offered in an item catalog;
    receiving second data associated with the a user-created reusable pass-phrase and a first dynamic password, wherein the user-created reusable pass-phrase: (i) comprises at least two grammatically correct words separated by a space, (ii) is associated with one or more predefined rules specifying an item category or a transaction amount that is allowed when employing the pass-phrase to conduct a transaction based on the request to purchase the item, and (iii) links to a payment instrument so that the pass-phrase acts as a proxy for the payment instrument;
    accessing third data associated with a second dynamic password accessible by the transaction processing service;
    accessing fourth data associated with at least one of the one or more predefined rules associated with the pass-phrase;
    based at least partly on the second dynamic password and the one or more predefined rules, performing one of:
        transmitting an approval of the transaction based at least partly on: (i) the first dynamic password matching the second dynamic password and (ii) at least one of the amount of the transaction being at or below the transaction amount specified by the one or more predefined rules or the item category of the item matching the item category specified by the one or more predefined rules;
        transmitting a rejection of the transaction based at least partly on-at least one of the following: the first dynamic password not matching the second dynamic password, the amount of the transaction being above the transaction amount specified by the one or more predefined rules, or the item category of the item not matching the item category specified by the one or more predefined rules; or
        implementing one or more other authorization procedures based at least partly on at least one of the following: the first dynamic password not matching the second dynamic password, the amount of the transaction being above the transaction amount specified by the one or more predefined rules, or the item category of the item not matching the item category specified by the one or more predefined rules.

* * * * *